No. 656,875. Patented Aug. 28, 1900.
C. A. BEHLEN.
THILL COUPLING.
(Application filed May 25, 1900.)
(No Model.)
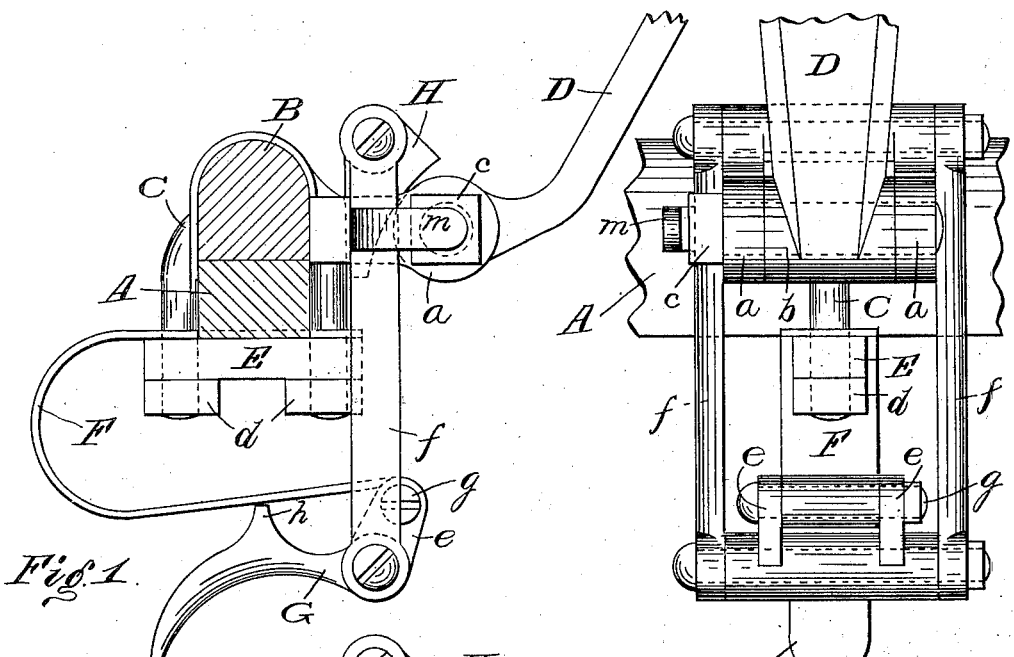
Fig.1.
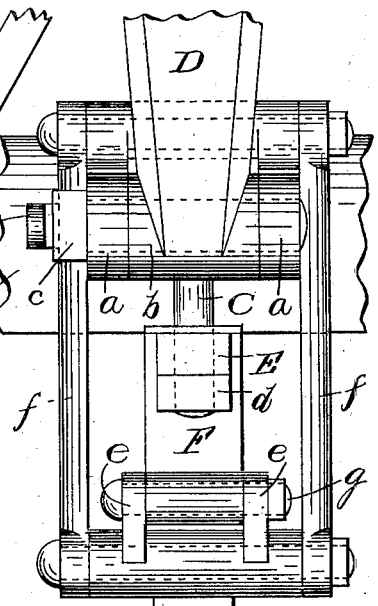
Fig.3.
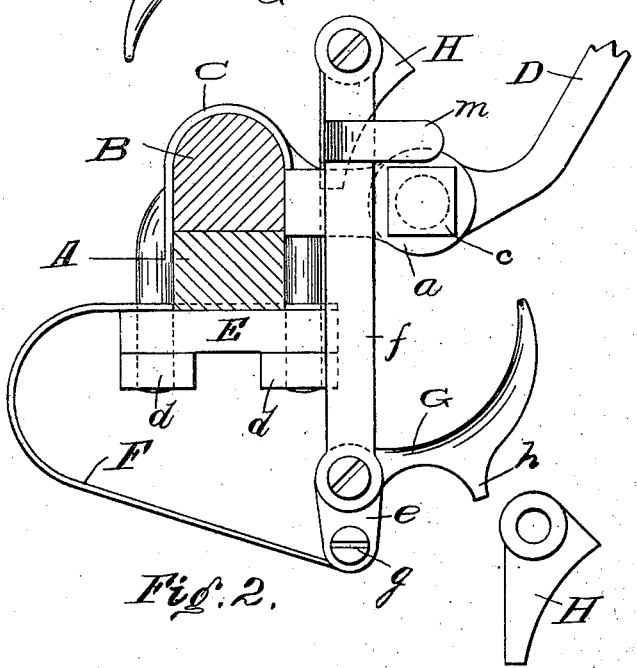
Fig.2.
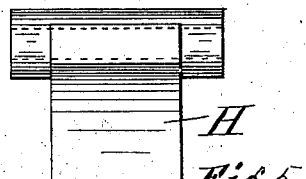
Fig.4.
Fig.5.
Witnesses
W. S. Kyle.
Charles W. Hoffman.
Inventor
Charles A. Behlen
by Alfred M. Allen
Attorney

UNITED STATES PATENT OFFICE.

CHARLES A. BEHLEN, OF CINCINNATI, OHIO.

THILL-COUPLING.

SPECIFICATION forming part of Letters Patent No. 656,875, dated August 28, 1900.

Application filed May 25, 1900. Serial No. 17,908. (No model.)

*To all whom it may concern:*

Be it known that I, CHARLES A. BEHLEN, a citizen of the United States, residing at Cincinnati, in the county of Hamilton, State of Ohio, have invented certain new and useful Improvements in Thill-Couplings, of which the following is a full, clear, and exact description, reference being had to the accompanying drawings, forming part of this specification.

My invention relates to thill-couplings, and has for its object to provide a simple, cheap, and effective means to prevent rattling of the coupling and to hold the coupling-bolt in place without the use of a bolt-nut, so that the shaft-irons may be quickly shifted, as the requirements may demand; and it consists of a certain novel construction and arrangement of parts, to be hereinafter particularly pointed out and claimed, in which my device is simply added to the ordinary thill-coupling, so that in making use of my improvement no changes whatever are required to be made in the ordinary coupling.

It has long been customary to insert pieces of rubber between the axle or clip and the head of the thill-iron to prevent rattling, and as a substitute for the rubber metal springs have been employed, inserted between the axle and thill-iron; but in both of these cases elasticity is soon lost. The rubber is destructible, and therefore expensive, and the space between the axle and the thill-iron being usually contracted the pressure of a metal spring inserted in the place of the rubber soon weakens.

The main object of my invention is to substitute for these yielding spring-pressure devices an unyielding metal wedge-block coupled with a powerful spring to keep the wedge-block tightly forced between the axle or clip and the head of the thill-iron.

In the drawings, Figure 1 is a side elevation of my improved coupling in locked position. Fig. 2 is a similar view unlocked. Fig. 3 is a front elevation of the coupling as shown in Fig. 1. Figs. 4 and 5 are side and front views of the wedge-block.

A is the axle, and B the axle-cap, clamped by the usual clip C, provided with forwardly-extending ears $a\ a$, between which ears the head $b$ of the thill-rim D is coupled by the usual bolt $c$.

E is the usual clip-plate, and $d\ d$ the nuts for securing the clip to the axle.

So far it will be noted that the construction is that of the ordinary thill-coupling.

Secured, preferably, between the clip-plate E and the axle is the upper end of a tension-spring F, holes being punched in the spring to allow for the passage of the ends of the clips and one of the holes being preferably slotted to permit adjustment to varying sizes of axle-clips.

G is an angular clamping-lever, to the short arm $e$ of which is pivotally connected the lower free end of the tension-spring F.

H is an unyielding wedge-block, preferably of solid metal, for insertion between the axle or clip and the head of the thill-iron, and for this reason the inner face of the block is preferably straight, while the outer face is curved to obtain better contact with the cylindrical surface of the head of the thill-iron. This wedge-block is pivotally connected by the links $ff$ with the knuckle of the clamping-lever, so that as the clamping-lever is pressed down from the open position, as shown in Fig. 2, the tension-spring pivot-bolt $g$ forms the fulcrum-point to draw down the wedge-block between the clip, its ears, and the head of the thill-iron. As the lever is further swung inward the tension-spring is compressed, drawing the wedge-block with powerful pressure against the thill-coupling and holding it against any rattling. The clamping-lever is pressed back until the pivotal point of the tension-spring is thrown beyond the link-pivot and the lug $h$ on the lever is thrown against the lower face of the spring, when the lever will become locked with the pressure of the spring F exerted against the wedge-block H, as shown in Fig. 1, any wear on the wedge-block being taken up by the spring.

One of the links $f$ is provided with a lug $m$, which when the antirattling device is locked, as shown in Fig. 1, projects out over the head of the coupling-bolt $c$ and prevents it from displacement, so that no nut need be used to secure the bolt, and the bolt $c$ may be instantly removed when the coupling-lever is released when it is desired to change from shaft to pole or for any reason the shafts are required to be shifted.

Having thus described my invention, what I claim, and desire to secure by Letters Patent, is—

1. In a thill-coupling, a combination with the clip, and its forwardly-extending ears, the thill-iron and bolt for coupling the thill-iron to the clip, of an unyielding wedge-block inserted between the clip and the head of the thill-iron, a tension-spring secured to the axle at one end, and links pivotally connecting the wedge-block to the free end of said spring and a clamping-lever for compressing the spring to bring pressure to bear on the wedge-block, substantially as shown and described.

2. In a thill-coupling the combination, with the clip, and its forwardly-projecting ears, the thill-iron, and bolt for coupling the thill-iron to the clip, of an unyielding wedge-block inserted between the clip and the head of the thill-iron, a tension-spring secured to the axle at one end, and an angular clamping-lever, to one arm of which the free end of said spring is pivoted and links pivotally connecting the knuckle of said lever with said wedge-block, whereby the operation of said lever will compress the spring to bring pressure to bear on the wedge-block, substantially as shown and described.

CHARLES A. BEHLEN.

Witnesses:
  W. S. KYLE,
  GEORGE B. WEIDLER.